Dec. 30, 1930.   W. R. PETERSON   1,786,863
DISK HARROW
Filed Aug. 11, 1928
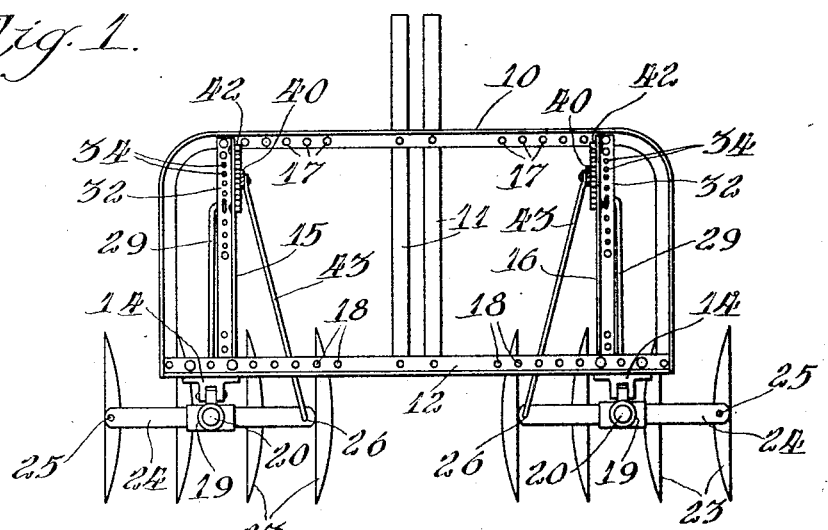
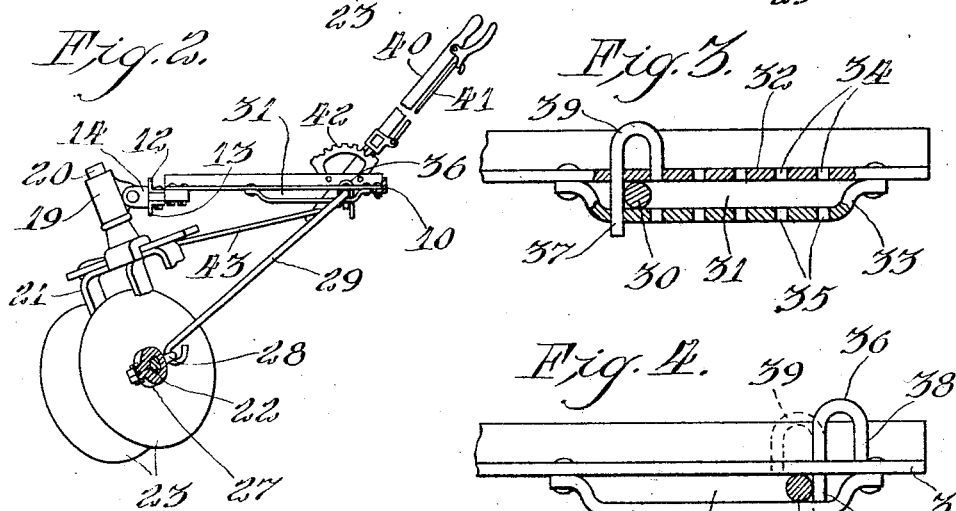
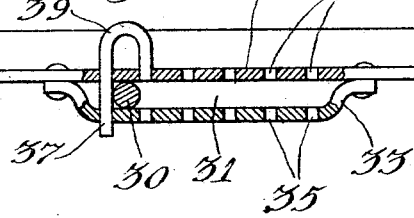
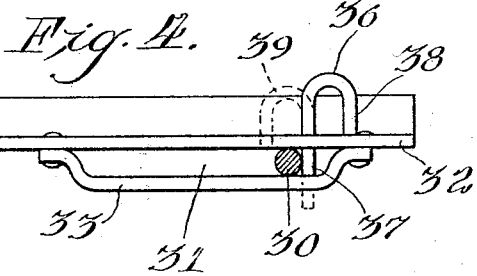
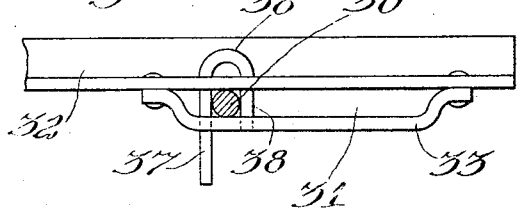
Inventor.
Walter R. Peterson.

Patented Dec. 30, 1930

1,786,863

UNITED STATES PATENT OFFICE

WALTER R. PETERSON, OF PARK RIDGE, ILLINOIS, ASSIGNOR TO INTERNATIONAL HARVESTER COMPANY, A CORPORATION OF NEW JERSEY

DISK HARROW

Application filed August 11, 1928. Serial No. 299,019.

This invention relates to disk harrows and more particularly to a multiple gang disk harrow having means for angling and tilting the gangs by the application of draft force.

An object of the invention is to provide a disk harrow having novel mechanism for the angling and tilting of the gangs by the application of draft force to the frame of the harrow.

Another object of the invention is to provide a reversible disk harrow having novel gang locking mechanism which is attached so as to provide a stop for limiting the extent of tilting of the harrow by the application of draft force.

Other objects of the invention will appear as the description proceeds.

An illustrative embodiment of the invention is disclosed in the accompanying drawings in which:

Figure 1 is a plan view of the harrow;

Figure 2 is substantially a side elevation showing one of the gangs partially broken away and located in one of its tilted and angled positions so as to indicate the working of the gang angling and tilting mechanism;

Figure 3 is a detail view showing the limit stop for the draft tilting mechanism in position to be moved to lock a disk gang in angled and tilted condition;

Figure 4 is a somewhat similar detail view illustrating the manner in which the tilting lock and limit stop may be arranged so as to be held in its non-locking position; and Figure 5 is a detail view showing the limit stop and lock in its locking position.

The drawings disclose a harrow having a draft frame 10 provided with fore and aft extending tongue members 11. The rear transverse part of the draft frame is made up of vertically spaced members 12 and 13 which afford a guide track along which the relatively fixed pivot block 14 may be adjusted transversely of the draft frame. Extending between the forward and rear parts of the frame 10 are unit frames indicated generally at 15 and 16. These unit frames are illustrated as being adjustable transversely of the frame 10, which, for that purpose, is provided with separate series of holes 17 and 18. The drawings disclose the pivot blocks 14 as being rigid with the different unit frames 15 and 16.

Pivotally connected to each relatively fixed pivot block 14 is a relatively movable pivot block 19. This affords an upright journal for the post 20 with which a disk frame 21 is rigidly associated. Each disk frame has downwardly extending legs attached to an axle 22 upon which conventional earth working disks 23 are mounted. In addition, each disk gang carries a transversely extending bar 24 formed with openings 25 and 26 at its respective ends for the attachment of devices for angling the gang upon its upright axis.

Figure 2 illustrates a journal box 27 shown having an ear 28 by which the gang is connected by a gang tilting link 29 with the frame. The forward and upper end 30 of the link 29 is illustrated as angled with respect to the main part of the link so as to provide a portion slidable in a guideway 31 afforded by the parallel members 32 and 33 formed with vertically aligned pairs of holes 34 and 35.

When the harrow is in operating condition, each disk gang is held located between the members 32 and 33 by a limit stop and lock member 36 shown as a U-shaped member having a long leg 37 and a much shorter leg 38. The purpose of providing a member of this particular construction is illustrated in Figure 4 of the drawings in which the shorter leg 38 is shown as moved to a position wherein it cannot pass through any of the openings 34. It is there supported by the member 32 of the unit frame so that the draft link 29 is shiftable under the influence of draft force along the guideway 31. If it is desired to lock the member 30 in the position in which it is shown in Figure 4, the limit stop and lock member 36 is moved to the dotted line position 39 and the member is moved downwardly to such a locking position as that indicated in Figure 5 of the drawings.

When the parts above described are in the condition illustrated in Figure 3 of the drawings, the gangs are subject to tilting and angling by the application of a backward draft force to the frame. This moves the frame rearwardly relative to the link 29 and the member 30 so as to change the angle and tilt of the gangs. If the members 30 and 32 are to be held in the positions in which they are shown in Figure 3, the member 36 is merely pushed downwardly so as to lock them in the relative positions there shown.

When the parts are in the positions in which they are shown in Figure 4, the gangs are subject to change by the application of a forward draft force to the frame. This causes the member 30 to be located in a position at the opposite end of the guideway 31.

The drawings illustrate gang angling mechanism preferably carried by each unit frame. This mechanism comprises a hand lever 40 with its accompanying conventional detent mechanism 41 and detent bracket 42. The gang angling link 43 connects either end of a disk frame with its corresponding lever 40. Opposite openings 25 and 26 are provided in the member 24 so that the link 43 may be similarly connected with the disk gang whenever it is desired to reverse a gang.

Although the invention has been described with reference to one particular mechanism, it is to be appreciated that it is not limited thereto, but that it is of a scope commensurate with the scope of the subjoined claims.

What is claimed as new is:

1. A harrow comprising, in combination, a support, a plurality of disk gangs, an axle for each disk gang, a gang frame mounting the axle of each gang and normally arranged in upright position, means connecting each gang frame with the support so that the associated gang may turn upon an upright axis to be angled and may turn upon a transverse axis to be tilted, means connecting each disk frame and the support for angling a gang, and means connecting each gang axle and the support for tilting the gang, said last named means including an adjustable limit stop lock and slidable connections for enabling a gang to be turned upon its transverse axis by the application of draft to the support.

2. A disk harrow comprising, in combination, a draft frame, auxiliary frame units carried by the draft frame so as to be adjustable transversely thereof, vertically spaced transverse frame members constituting a part of the draft frame, a relatively fixed pivot block rigidly associated with each unit frame and located between said vertically spaced members so as to be adjustable with the unit frame transversely of the draft frame, a relatively movable pivot block pivotally associated with each fixed pivot block, an upright post journaled in each relatively movable pivot block, a gang frame secured to each post below the draft frame, a disk gang carried by each gang frame, gang moving mechanism carried by each unit frame, a link connecting each gang moving mechanism with the corresponding gang frame so as to turn the latter upon its upright axis, a gang tilting link connecting each disk gang with the corresponding unit frame, spaced members formed with aligned holes and carried by each unit frame so as to afford a track upon which the forward end of the tilting link may slide fore and aft, and a U-shaped locking member arranged so as to pass between adjacent pairs of vertically aligned holes in said members and having one leg substantially longer than the other so as to afford a lock and a variable limit stop to permit the associated disk gang to be tilted by the application of draft force to the draft frame.

In testimony whereof I affix my signature.

WALTER R. PETERSON.